No. 734,352. Patented July 21, 1903.

UNITED STATES PATENT OFFICE.

ANTON JOHANNES NESSO, OF NORDEN, GERMANY.

METHOD OF PRODUCING MUSSEL EXTRACTS.

SPECIFICATION forming part of Letters Patent No. 734,352, dated July 21, 1903.

Application filed March 31, 1903. Serial No. 150,464. (No specimens.)

*To all whom it may concern:*

Be it known that I, ANTON JOHANNES NESSO, goldsmith, a subject of the German Emperor, and a resident of No. 95 Neuer Weg, Norden, in the Empire of Germany, have invented a certain new and useful Improved Method of Producing Mussel Extracts, of which the following is an exact, full, and clear description.

The extract produced according to the present method has a pleasant taste, is easy to digest, of very high nutritive power, and appetizing, so that it can be used advantageously as a nutritious substance for invalids and convalescents. Owing to the large proportion of albumen substance the extract is also suitable as a nutrient for healthy persons. The sea-mussel, (*Mytilus edulis*,) which is found in large quantities in nearly all seas around European and other coasts and can therefore be obtained easily and at a very cheap price, constitutes the raw material of said extract. It is well known that the meat and juices of sea-mussels contain a large proportion of bitter-tasting sea-salt and bad-tasting train-oil. These ingredients, which cannot be removed according to the usual method of extraction, are thoroughly removed according to the present invention from the live mussels by a suitable weaning and nourishing process. This preliminary treatment of the live sea-mussels renders it possible to obtain a useful extract partly from the juice from the meat of the mussel.

The method of treatment consists in taking the fresh sea-mussels out of the sea-water and putting them into a nourishing bath, which can be replaced at certain intervals by a fresh one, and consists of a mixture of fresh water, milk, and salt, with an increasing proportion of milk and a decreasing proportion of salt.

The method of treatment is carried out in such a manner that first of all the sea-mussels are placed in a bath of fresh water, to which salt and milk are added in the following proportions—namely, ninety-six per cent. water, 2.5 per cent. salt, and 1.5 per cent. milk. After remaining in this bath for twelve hours the mussels are then put into fresh water, to which salt and milk are added in the following proportions—namely, two per cent. salt and two per cent. milk. After a period of twenty-four hours they are again placed in fresh water, to which salt and milk are added in the following proportions—namely, ninety-six per cent. water, one per cent. salt, and three per cent. milk. When the mussels have been in this bath for a further period of twenty-four hours, they are put into fresh water containing three per cent. milk, but no salt, and remain therein for another twenty-four hours. The nourishing liquid must always be fresh and kept at a temperature suitable for the mode of living of the mussels.

The sea-mussels treated in the herein-described manner are made into extract after the removal of the shells and the like, and the usual method of producing meat extract and the like may be employed for this purpose. Owing to the live mussels being subjected to the herein-described treatment the extract produced forms a palatable product which is free from oils and bitter salts.

An advantageous method of obtaining the extract is carried out as follows: The mussels are placed in a boiler without water and the boiler is heated, whereby the shells are opened and the liquid contained therein runs out. In this liquid the mussels are then boiled until the meat (the conchifer) is formed into a solid mass, which takes place in about twenty minutes. The mussels are then deprived of their shells and cleaned in a suitable manner—*i. e.*, the stomach and its contents are removed. The said liquid is afterward put into a vessel on the fire, the meat of the mussel being added thereto, and the mixture boiled for about eight hours. The boiled meat is then removed and the broth filtered. After this broth has been carefully boiled, so as to produce the thick liquid which the extract must possess, the extract is ready, and in consequence of the above-mentioned treatment it forms a brown, very nutritious, and palatable product.

Having now particularly described and ascertained the nature of the said invention, I declare that what I claim, and wish to secure by Letters Patent, is—

1. Improved method of producing a sea-mussel extract, consisting in subjecting the live mussels for the purpose of removing oils and bitter salts, to a repeated treatment in fresh water, common salt and milk, decreasing said solution in respect to the proportion of common salt and increasing it in respect to the proportion of milk and then preparing same into extract, substantially as described and for the purpose set forth.

2. Improved method of producing a sea-mussel extract, consisting in subjecting the live mussels to a repeated treatment in fresh water, common salt and milk, decreasing said solution in respect to the proportion of common salt and increasing it in respect to the proportion of milk and heating the sea-mussels, without an addition of salt, in their juice until the meat forms a solid mass, whereupon the latter after being separated from the shells and cleaned, is boiled with the juice and the broth obtained is filtered and boiled down to extract consistency, substantially as described and for the purpose set forth.

In witness whereof I have hereunto set my hand in presence of two witnesses.

ANTON JOHANNES NESSO.

Witnesses:
HEINRICH LAMMERT,
EMIL KREHME.